United States Patent
Yoshikawa et al.

(10) Patent No.: US 7,626,299 B2
(45) Date of Patent: Dec. 1, 2009

(54) MOTOR

(75) Inventors: Yuichi Yoshikawa, Osaka (JP); Hiroshi Murakami, Osaka (JP); Yukinori Nakagawa, Fukui (JP); Masahiko Morisaki, Fukui (JP); Hu Li, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 11/912,947

(22) PCT Filed: Apr. 17, 2007

(86) PCT No.: PCT/JP2007/058318
§ 371 (c)(1),
(2), (4) Date: Oct. 29, 2007

(87) PCT Pub. No.: WO2007/123107
PCT Pub. Date: Nov. 1, 2007

(65) Prior Publication Data
US 2009/0072650 A1  Mar. 19, 2009

(30) Foreign Application Priority Data
Apr. 20, 2006  (JP) .............................. 2006-116435

(51) Int. Cl.
*H02K 16/00* (2006.01)
*H02K 16/02* (2006.01)
(52) U.S. Cl. ....................................... 310/114; 310/112
(58) Field of Classification Search .................. 310/266, 310/112–114, 156.36–156.37
See application file for complete search history.

(56) References Cited

U.S. PATENT DOCUMENTS

| 6,707,209 | B2 * | 3/2004 | Crapo et al. ........... 310/156.43 |
| 6,903,471 | B2 * | 6/2005 | Arimitsu et al. ............... 310/59 |
| 2004/0232800 | A1 * | 11/2004 | Seguchi et al. .............. 310/266 |
| 2005/0017591 | A1 * | 1/2005 | Brewster et al. ............ 310/179 |

FOREIGN PATENT DOCUMENTS

| JP | 2001-37133 A | 2/2001 |
| JP | 2002-165426 A | 6/2002 |
| JP | 2005-521378 A | 7/2005 |
| JP | 3725510 B2 | 9/2005 |

OTHER PUBLICATIONS

Japanese language International Search Report for PCT/JP2007/058318, dated Jul. 17, 2007.

* cited by examiner

*Primary Examiner*—Quyen Leung
*Assistant Examiner*—Leda Pham
(74) *Attorney, Agent, or Firm*—RatnerPrestia

(57) ABSTRACT

A motor includes a stator with an annular stator yoke, a stator core having a plurality of inner and outer teeth projecting from the stator yoke toward inside and outside respectively, a plurality of coils wound on the stator core, and an inner rotor and an outer rotor confronting the inner and outer teeth respectively via an air-gap, and having an permanent magnet respectively. The number of slots "S" and the number of poles "P" establish a relation of S:P=3:2N−1, where N is an integer equal to 1 or more, and a case when 2N−1 becomes a multiple of 3 is excluded.

6 Claims, 7 Drawing Sheets

Rotor position (in electrical angles)

Rotor position (in electrical angles)

MOTOR

This application is a U.S. National Phase Application of PCT International application PCT/JP2007/058318.

TECHNICAL FIELD

The present invention relates to a motor having two rotors, namely, an inner rotor and an outer rotor, and a stator wound with toroidal winding.

BACKGROUND ART

A brushless motor is used, e.g. as a driving motor of a direct-drive washing machine, and such a motor desirably spins at a low speed with large torque, and produces low vibration and low noise. The motor used as a direct driving motor has no gear and needs large torque, for it drives an object directly, so that the motor employs an outer-rotor structure and a stator wound with concentrated winding as shown in FIG. 1 and FIG. 4 which depict the reference patent document 1.

In general, a motor requiring a low rpm with large torque employs the concentrated winding. A motor with a distributed winding obtains more interlinkage magnetic flux in the winding than the motor with the concentrated winding, so that the motor with distributed winding tends to produce output torque greater than the motor with the concentrated winding by 10-15%.

However, the motor with the concentrated winding can have a coil end smaller than that of the motor with the distributed winding, so that it can reduce a resistance of the winding, and from a total view of point, the motor with the concentrated winding produces heat lower than the motor with the distributed winding when they need the same output torque. Since its coil end can be smaller than that of the other, the volume of the motor can be reduced. It can be thus concluded that the motor with the concentrated winding is good for an application that needs large torque at a low rpm, and requires in particular a downsized body. At a high rpm, this motor also employs field-weakening control (a phase-advancing driving method), so that an electric current phase is driven with an advancing phase angle.

However, the motor with the concentrated winding produces greater radial force than the motor with the distributed winding, so that it produces greater vibration and noise. FIG. 7A shows a simulation of a single-rotor motor with the concentrated winding, and FIG. 7B shows a simulation of a single-rotor motor with the distributed winding. These Figures tell that the motor with the concentrated winding produces substantially greater radial force than the motor with the distributed winding. Since the motor spins at a low speed, it tends to be subject to the influence of cogging torque. The motor spinning at a low rpm with large torque and used in a direct-drive washing machine is thus required to produce small cogging torque and small radial force.

Reference patent document 2 discloses a motor having two rotors, namely, an inner rotor and an outer rotor. Hereinafter this motor is referred to as a double-rotor motor with concentrated winding. This double-rotor motor with concentrated winding has the following structure divided teeth wound with concentrated winding, and which teeth are coupled together by molding for forming a stator; and two rotors, each of which inside and outside are stuck with permanent magnets, and having a uniform space between the stator. (Refer to FIG. 8 that depicts the reference patent document 2.)

The permanent magnets stuck to the inside have different poles from those stuck to the outside, so that the magnetic flux travels from the outer rotor to the inner rotor via the teeth of the stator, and returns to the outer rotor via the teeth of the stator, i.e. it forms a loop. Since this double-rotor motor with concentrated winding can use the magnetic fluxes traveling through both inside and outside rotors, it can produce a greater output density than a conventional single-rotor motor. However, the double-rotor motor still employs the concentrated winding as the single-rotor motor does, it produces greater radial force, so that its vibration and noise still remain great.

Reference patent document 3 discloses a motor having two rotors, namely, an inner rotor and an outer rotor, and its stator is wound with toroidal winding. FIG. 8 shows a sectional view of this motor. This motor comprises the following elements: stator 110; inner rotor 120; and outer rotor 130, to be more specific, the motor is a double-rotor with toroidal winding, and has 8 poles and 12 slots.

Stator 110 is formed of stator yoke 114, outer teeth 112 and inner teeth 113 both provided to stator yoke 114. Stator yoke 114 is wound with three-phase coils 115. In general, coils 115 are coupled together in a manner of star-shaped wire connection or a delta-shaped wire connection.

Inner rotor 120 is rotatably held inside stator 110 and is formed of inner rotor yoke 121 and inner permanent magnets 122. Outer rotor 130 is rotatably held outside stator 110 and is formed of outer rotor yoke 131 and outer permanent magnets 132. Inner rotor 120 and outer rotor 130 are driven with the magnetic field produced by the current running through coils 115. FIG. 8 shows a surface-magnet rotor, i.e. permanent magnets 122 and 132 are mounted on the surfaces of inner rotor 120 and outer rotor 130 respectively.

FIG. 9A shows an induction voltage waveform actually measured with respect to a rotor position in the case of 24 poles and 18 slots. FIG. 9B shows an induction voltage waveform actual measured with respect to a rotor position in the case of 8 poles and 12 slots. The X-axis of each case represents a rotor position in electric angles. FIGS. 9A and 9B tell that the induction voltage waveforms are distorted asymmetrically because of buffer action between outer rotor 130 and inner rotor 120, and such a distortion in the induction voltage substantially increases the vibration and noise.

The foregoing prior art proves that use of two rotors allows increasing the output torque; however, e.g. the ratio of the number of slots (S) vs. the number of poles (P), S:P=3:2N (N is an integer equal to 1 or more) will make the winding configuration equal to that of the concentrated winding, so that the radial force becomes greater and thus the noise tends to increase.

In the case of a regular single-rotor motor with distributed winding, the structure allows canceling out the radial force; however, the structure enlarges the coil end, so that the resistance of the winding increases, which lowers the efficiency and physically enlarges the motor.

Reference Patent Document 1: Examined Japanese Patent No. 3725510

Reference Patent Document 2: Japanese Translation of PCT Publication No. 2005-521378

Reference Patent Document 3: Unexamined Japanese Patent Publication No. 2001-37133

DISCLOSURE OF INVENTION

A motor of the present invention comprises the following elements:
  a stator including:
    a stator core having:
      an annular stator yoke;
      a plurality of inner teeth projecting from the stator yoke toward inside along a radial direction;

a plurality of outer teeth, in equal quantity to the inner teeth, projecting from the stator yoke toward outside along the radial direction;

inner slots formed between each one of the inner teeth;

outer slots formed between each one of the outer teeth;

three-phase coils wound on the stator yoke between the inner slots and the outer slots, and connected to each other in a manner of one of a star-shaped wire connection or a delta-shaped wire connection:

an inner rotor confronting the inner teeth via an air-gap, and having an inner rotor yoke and an inner permanent magnet; and an outer rotor confronting the outer teeth via an air-gap, and having an outer rotor yoke and an outer permanent magnet, wherein the inner rotor and the outer rotor are mounted on the same rotary shaft.

The number "S" of inner slots is equal to the number of outer slots, and the number "P" of poles of the inner permanent magnet is equal to the number of poles of the outer permanent magnet. A relation of S:P=3:2N−1 is established, where N is an integer equal to 1 or more, and a case when 2N−1 becomes a multiple of 3 is excluded.

DESCRIPTION OF REFERENCE MARKS

Figure 1:
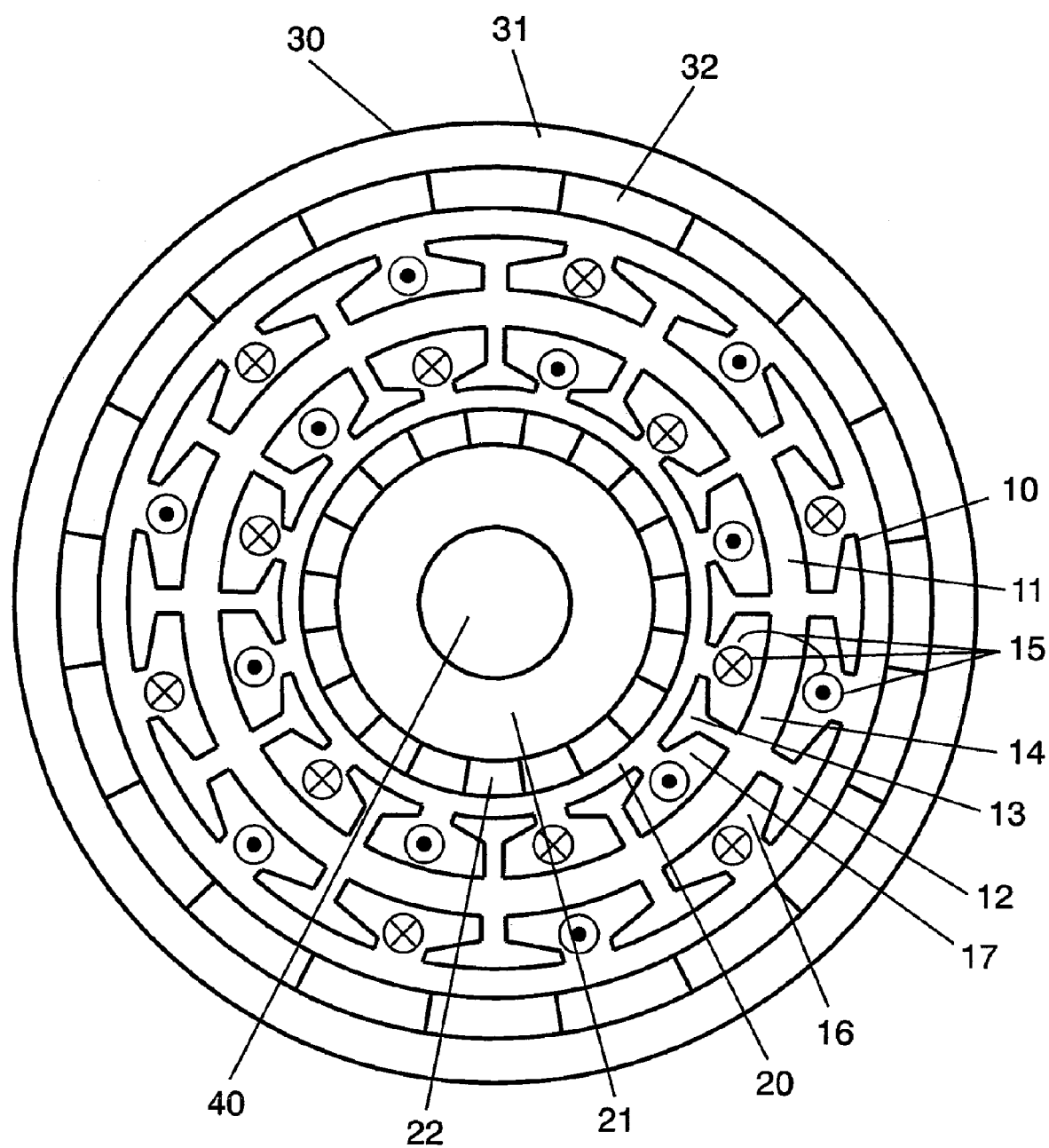
FIG. 1 shows a sectional view of a motor in accordance with an embodiment of the present invention.

10 stator
11 stator core
12 outer teeth
13 inner teeth
14 stator yoke
15 coil
16 outer slot
17 inner slot
20 inner rotor
21 inner rotor yoke
22 inner permanent magnet
30 outer rotor
31 outer rotor yoke
32 outer permanent magnet
40 rotary shaft

DESCRIPTION OF PREFERRED EMBODIMENT

An exemplary embodiment of the present invention is demonstrated hereinafter with reference to the accompanying drawings.

FIG. 1 shows a sectional view of a brushless motor with toroidal winding and two rotors in accordance with the embodiment of the present invention. This motor comprises the following elements:

stator 10;
inner rotor 20 confronting the inner wall of stator 10; and
outer rotor 30 confronting the outer wall of stator 10.

Stator core 11, an element of stator 10, is formed of annular stator yoke 14, outer teeth 12 projecting outward from stator yoke 14, inner teeth 13 projecting inward from stator yoke 14. Between each one of outer teeth, outer slots 16 are formed, and between each one of inner teeth 13, inner slots 17 are formed. A plurality of coils 15 are connected in a manner of a three-phase and star-shaped wire connection or a three-phase and delta-shaped wire connection, and coils 15 are wound on stator yoke 14 between outer slots 16 and inner slots 17 in the manner of concentrated winding.

Outer rotor 30 is placed confronting outer teeth 12 with a given air-gap in between. In a similar manner, inner rotor 20 is placed confronting inner teeth 13 with a give air-gap in between.

Outer rotor 30 is constructed this way: outer rotor yoke 31 is rigidly mounted to an inner wall of an outer rotor frame (not shown), and ring-shaped outer permanent magnets 32 are fixed on the inner wall of outer rotor yoke 31, which is jointed to the outer rotor frame by press-fit, shrink-fit, or bonding. Outer rotor yoke 31 forms a magnetic circuit and is formed by layering electromagnetic steel sheets punched out in a given shape.

In a similar manner, inner rotor 20 is constructed this way: inner rotor yoke 21 is rigidly mounted to an outer wall of an inner rotor frame (not shown), and ring-shaped inner permanent magnets 22 are fixed on the outer wall of inner rotor yoke 21, which is jointed to the inner rotor frame by press-fit, shrink-fit, or bonding. Inner rotor yoke 21 forms a magnetic circuit and is formed by layering electromagnetic steel sheets punched out in a given shape.

The inner rotor frame and the outer rotor frame are coupled to rotary shaft 40, and they are rotated together by exciting coils 15 in a given way. The motor in accordance with this embodiment thus can produce greater torque and higher output than a regular motor having an inner rotor or an outer rotor, for the driving torque produced by inner rotor 20 is added to that produced by outer rotor 30.

Figure 2:
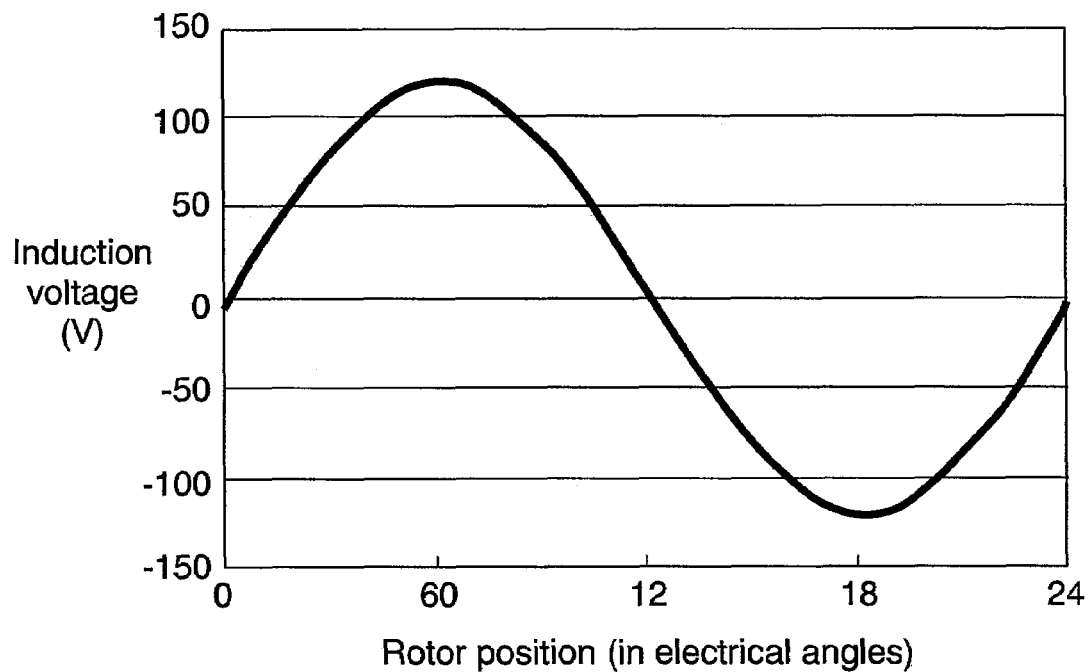
FIG. 2 shows a graph of an induction voltage waveform with respect to a rotor position of the motor in accordance with an embodiment of the present invention.

Inner rotor 20 of the motor in accordance with this embodiment has 20 poles, and outer rotor 30 has also 20 poles, they have the same number of slots, i.e. 12 slots. The combination of 20 poles and 12 slots allows this winding configuration to produce an effect similar to the distributed winding as shown in FIG. 2, which shows a graph of an induction voltage waveform with respect to a rotor rotating position in electric angles. The graph tells that the winding configuration produces an approx. sine-wave similar to that produced by the distributed winding. The combination, which produces a configuration of magnetic flux similar to that produced by the distributed winding, is expressed in this equation; S:P=3:2N−1, where N is an integer equal to 1 or more, and the case when 2N−1 becomes a multiple of 3 is excluded.

When the number of inner and outer slots of the stator and the number of poles of the inner and outer rotors satisfy the foregoing equation, the induction voltage waveform becomes a sine wave as shown in FIG. 2, so that the vibration and noise of the motor can be suppressed. Because a property of the distributed winding is used in this case, i.e. the distributed winding, in general, tends to produce the induction voltage waveform shaped like a sine wave rather than the concentrated winding does.

Figure 3:
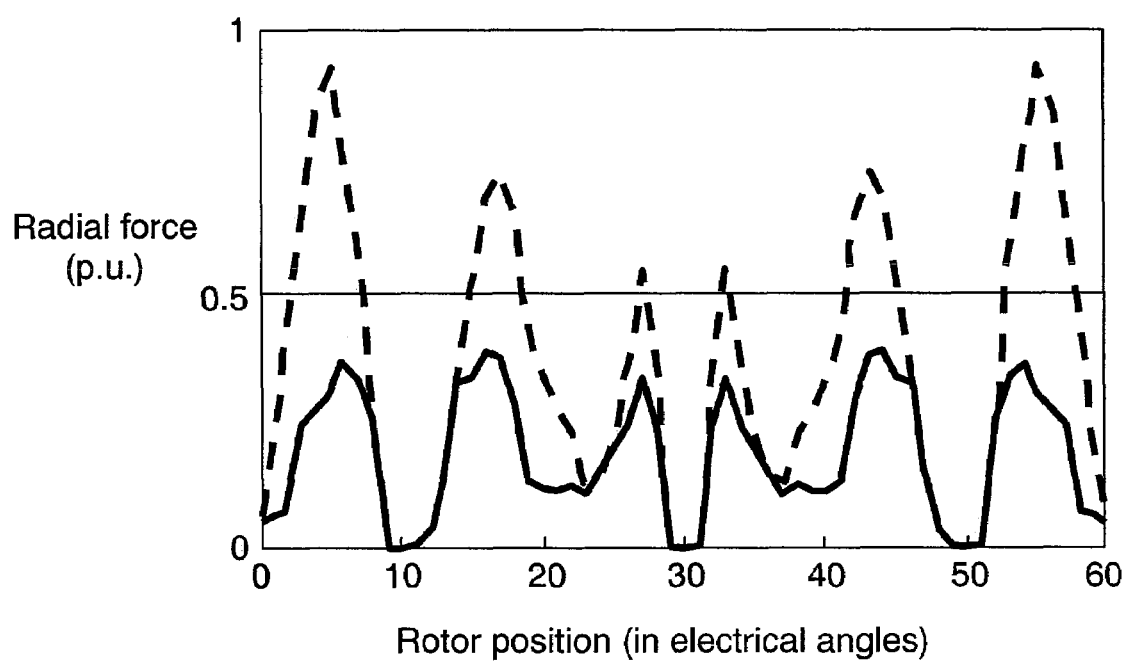
FIG. 3 shows a graph of radial force with respect to a rotor position of the motor in accordance with an embodiment of the present invention.

FIG. 3 shows a graph of radial force with respect to a rotor rotating position in electrical angles, and a solid line represents a double-rotor motor with toroidal winding in accordance with this embodiment, and a broken line represents a single-rotor motor with distributed winding for a comparison purpose. FIG. 3 tells that the double-rotor motor with toroidal winding can embody the winding configuration similar to that of the distributed winding, and yet, its inner rotor and outer rotor cancel out the vibration, thereby reducing the radial force.

For instance, a driving motor used in a direct-drive washing machine spins at a low speed such as 10 rpm-100 rpm. Since this speed is so low that cogging torque tends to affect the vibration and noise of the washing machine. Use of the double-rotor motor with toroidal winding in accordance with this embodiment allows reversing, e.g. the phase of cogging torque of the inner rotor with respect to that of the outer rotor, in other words, the phase of cogging torque of the inner rotor becomes reverse to that of the outer rotor, thereby canceling out the cogging torque.

Figure 4:
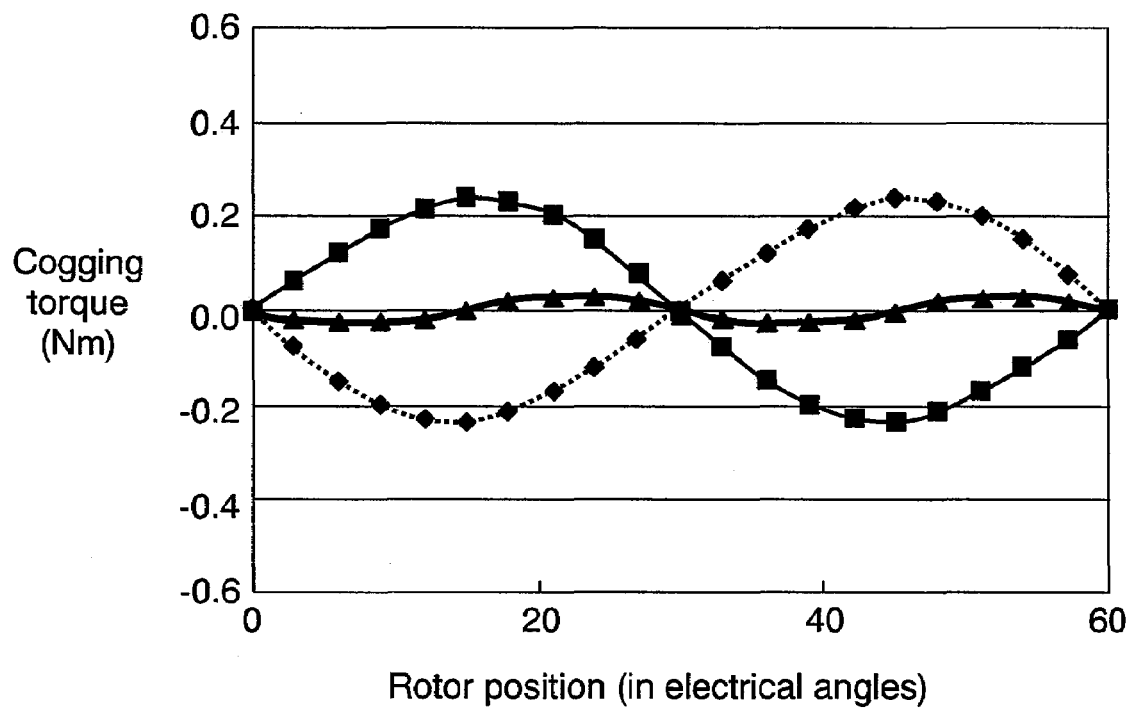
FIG. 4 shows a graph of cogging torque with respect to a rotor position of the motor in accordance with an embodiment of the present invention.

FIG. 4 shows a graph of a cogging torque waveform with respect to a rotor rotating position in electrical angles, produced by the double-rotor motor having toroidal winding. The dotted line represents the cogging torque produced by inner rotor 20, and the narrow solid line represents the cogging torque produced by outer rotor 30. The bold solid line drawn in the center represents the combined cogging torque of the whole motor. The graph tells that the phase of cogging torque produced by inner rotor 20 and outer torque 30 become reverse to each other, and yet, both of the waveforms have roughly similar heights to each other. These preparations allow substantially reducing the cogging torque of the motor. Use of the combination discussed previously thus allows the double-rotor motor with toroidal winding to reduce its vibration and noise substantially.

Figure 5:
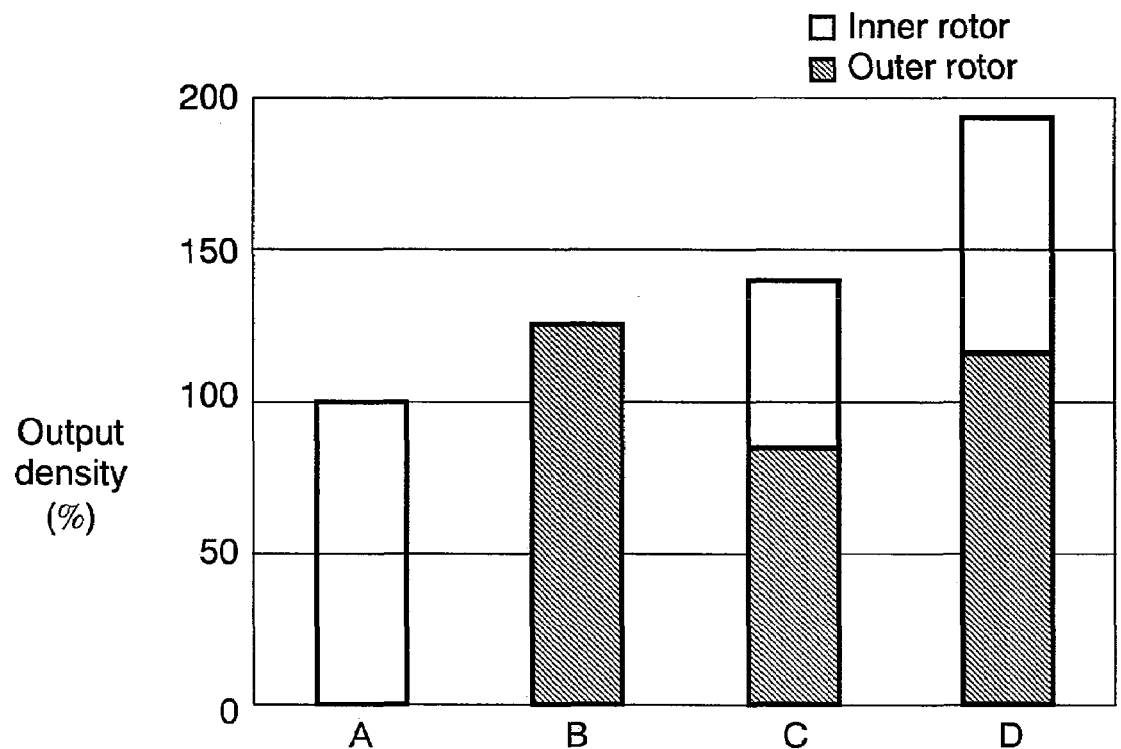
FIG. 5 shows a graph illustrating comparison between output densities of the motors in accordance with an embodiment of the present invention.

FIG. 5 shows a comparison of output density between the motor of the present invention and a conventional motor. The output density is an output per volume of the motor. Bar graph A represents an inner-rotor motor, bar graph B represents an outer-rotor motor, bar graph C represents a double-rotor motor with concentrated winding, and bar graph D represents the double-rotor motor with toroidal winding in accordance with this embodiment. The white spaces of the respective bar graphs represent the output density produced by the inner rotor, and the hatched spaces represent the output density produced by the outer rotor. As shown in bar graphs C and D, the double-rotor motor obtains an added-up output density by both of the inner and outer rotors.

Figure 6:
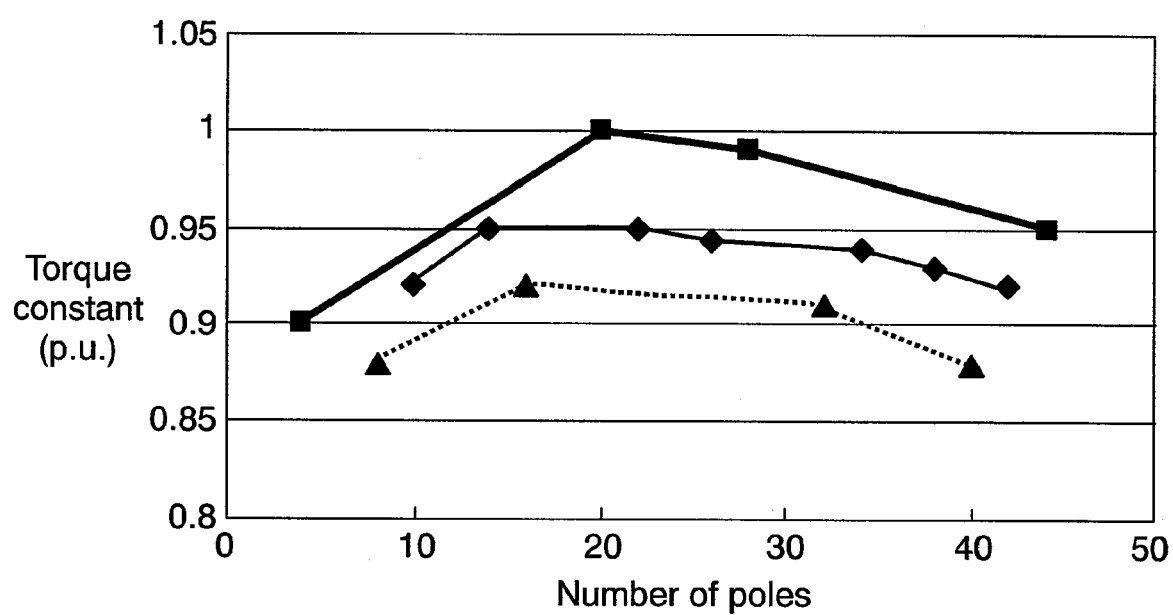
FIG. 6 shows a graph illustrating a relation between the number of poles and torque constants in accordance with an embodiment of the present invention.
Figure 7A:
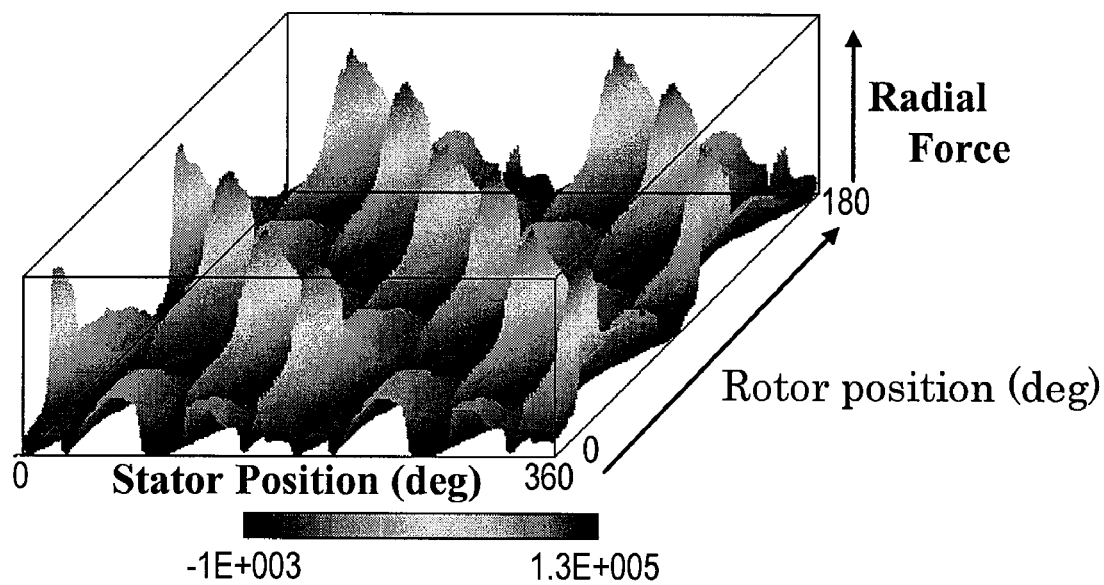
FIG. 7A shows a simulation of radial force of a conventional motor, i.e. a single-rotor motor with concentrated winding.
Figure 7B:
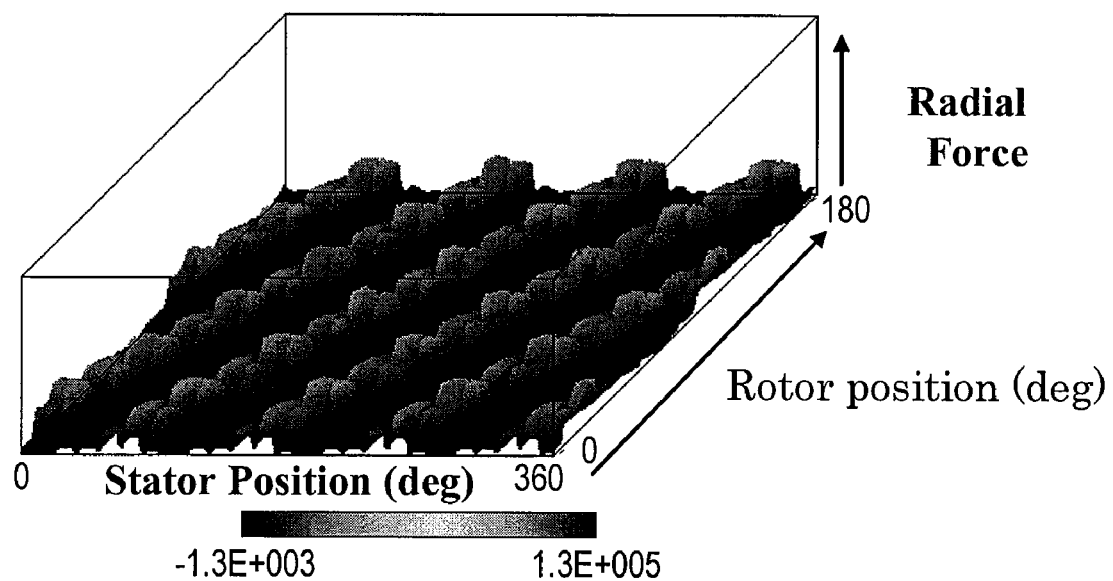
FIG. 7B shows a simulation of radial force of a conventional motor, i.e. a single-rotor motor with distributed winding.
Figure 8:
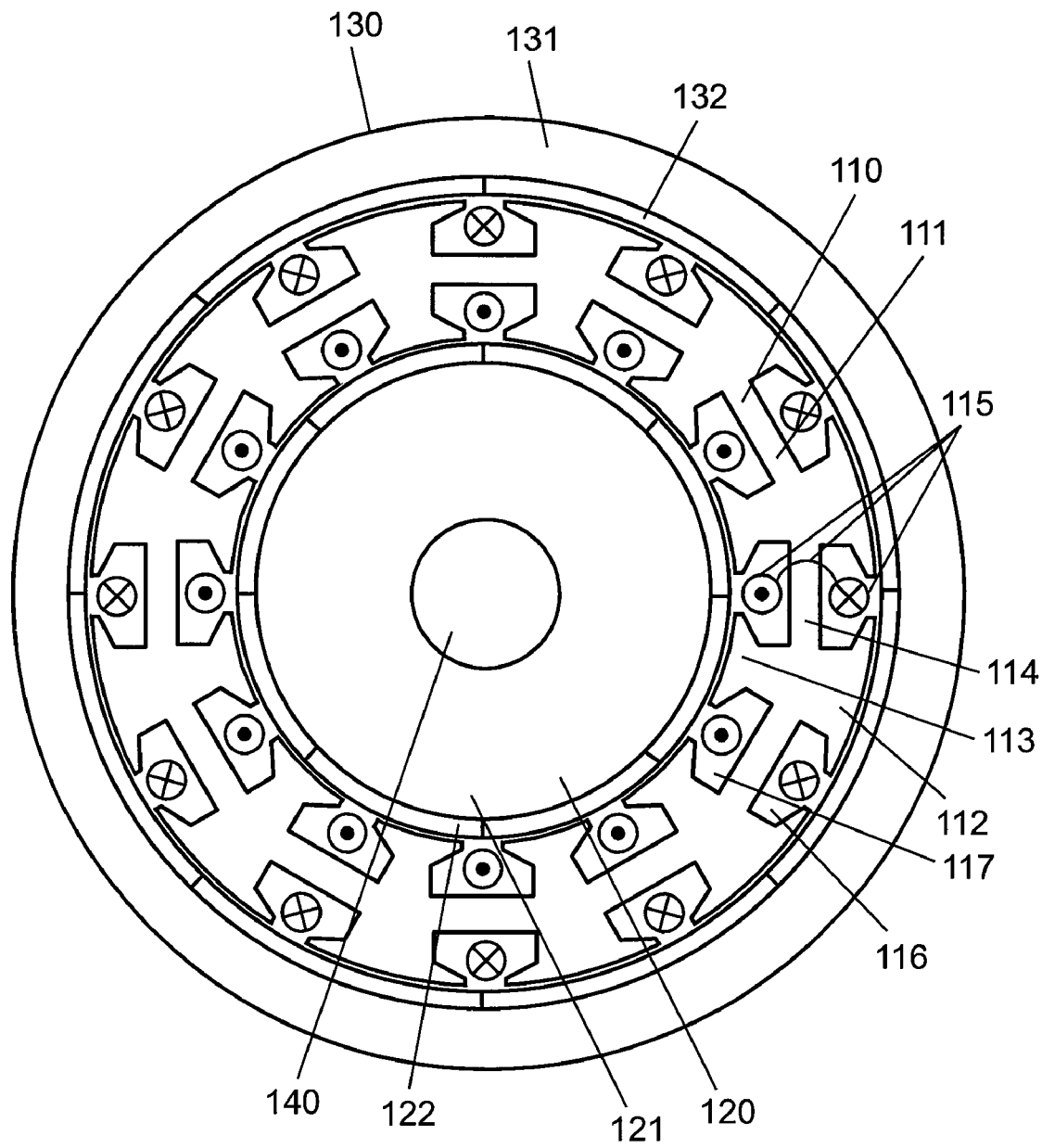
FIG. 8 shows a sectional view of a conventional motor.
Figure 9A:
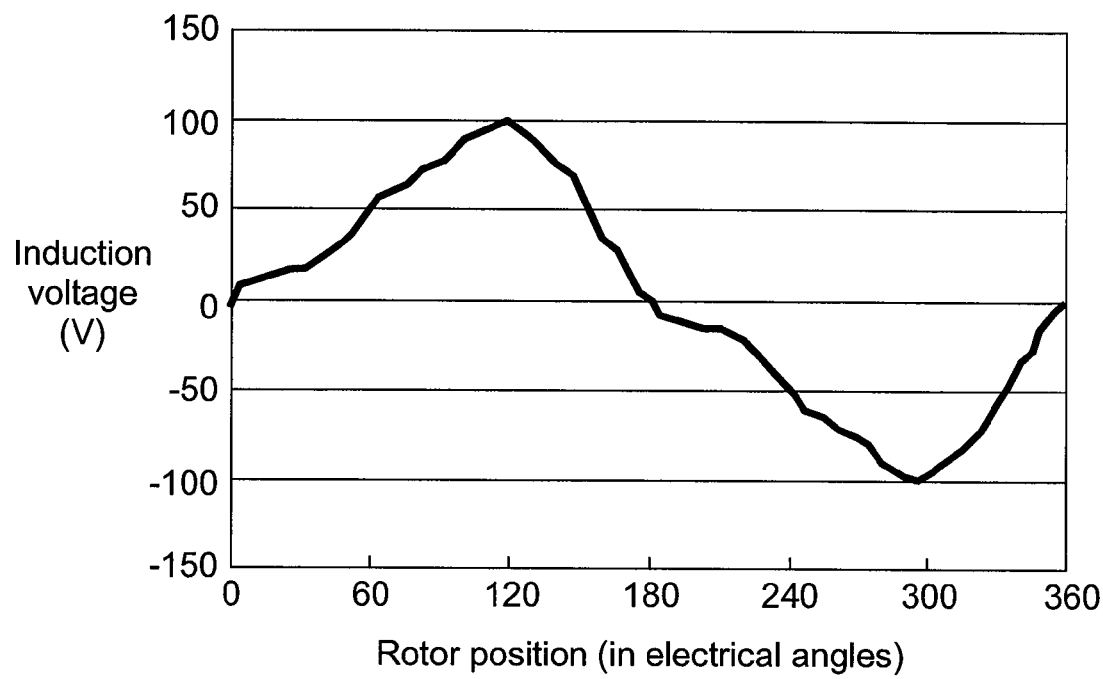
FIG. 9A shows a graph of an induction voltage waveform with respect to a rotor of a conventional motor having 24 poles and 18 slots.
Figure 9B:
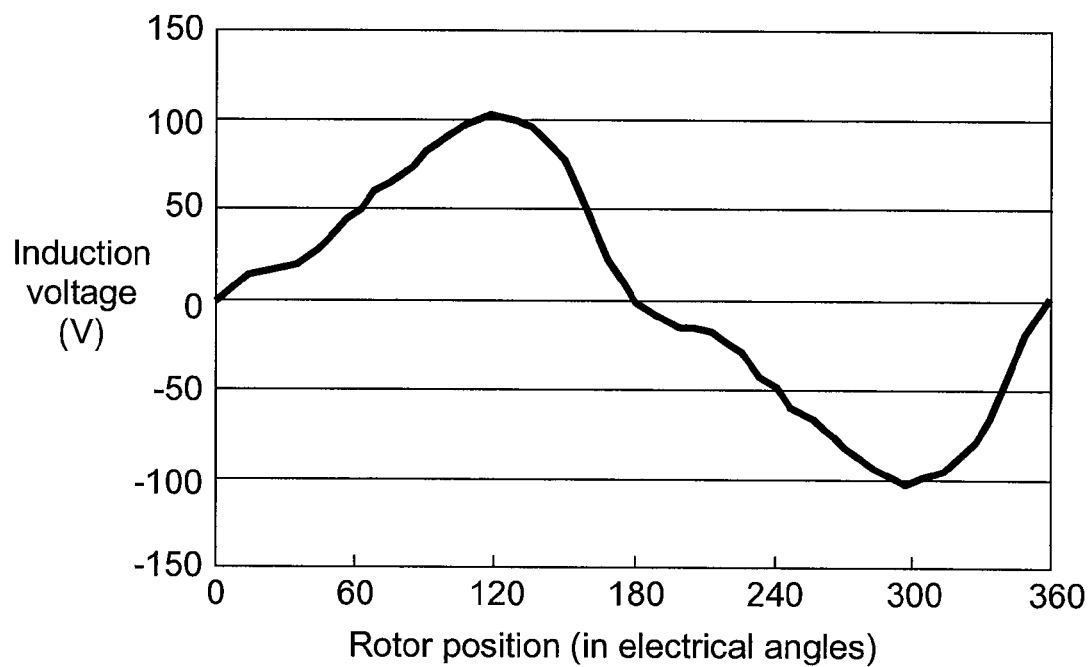
FIG. 9B shows a graph of an induction voltage waveform with respect to a rotor position of a conventional motor having 8 poles and 12 slots.

FIG. 6 shows a relation between the number of poles and a torque constant. The bold solid line represent the motor in accordance with this embodiment, the dotted line and the narrow solid line represent other motors for a comparison purpose. The bold solid line indicates the relation between the numbers of poles and slots (in this case, 12 slots) of the double-rotor motor with toroidal winding of the present invention. In this case, the number of slots is kept at 12, and the number of poles is varied. Torque constant is set at 1 (one) when the motor employs 20 poles and 12 slots, and then torque constant is measured when the motor employs 4 poles and 12 slots, 20 poles and 12 slots, 28 poles and 12 slots, and 44 poles and 12 slots. These combinations satisfy the equation discussed previously.

The dotted line indicates the relation between the numbers of poles and slots (12 slots) in an ordinary and conventional motor, which generally has a ratio of S:P=3:2N (N is an integer equal to 1 or more), so that the combination of 8 poles and 12 slots, 16 poles and 12 slots, 32 poles and 12 slots, and 40 poles and 12 slots are prepared. The narrow solid line indicates other combinations than the motor of the present invention and the conventional one. FIG. 6 tells that the motor of the present invention has better torque constants than the conventional one on every number of poles when they are compared with the same number of poles.

FIG. 5 tells that the double-rotor motor with toroidal winding of the present invention produces the output density as much as 1.9 times that of the single inner-rotor motor, and yet, produces the output density 1.5 times that of the single outer-rotor motor. Since the motor of the present invention obtains added-up output by both the inner and the outer rotors, it can make use of the space available for the driving motor, so that it can produce a substantially greater output than the conventional motor. FIG. 6 tells that the use of the foregoing combination between the numbers of slots and poles allows increasing the output torque substantially. Use of the motor of the present invention as a driving motor employed in a washing machine allows increasing a washing capacity from a conventional one to as much as 1.5-1.9 times while the driving motor keeps the same volume as the conventional motor. In other words, the driving motor can decrease its volume by 35-50% while the motor of the present invention keeps the same output as the conventional motor.

Comparing with the double-rotor motor having concentrated winding, the double-rotor motor having toroidal winding can obtain the output density as much as 1.4 times, so that the motor with toroidal winding can obtain 1.4 times of washing capacity while it keeps the same volume as the conventional driving motor. In the double-rotor motor with concentrated winding, the magnetic flux travels from the outer rotor to the inner rotor via the teeth of stator, and returns to the outer rotor via the teeth of stator, i.e. the magnetic flux draws the loop. Since the magnetic flux travels through both of the outer and inner magnets, many air-gaps apparently exist, so that the magnetic flux of the magnets are not usefully used.

On the other hand, the double-rotor motor with toroidal winding has two magnetic-flux loops, i.e. a first loop is this: the magnetic flux travels from outer rotor 30, outer teeth 12 of stator 10, stator yoke 14, and returns to outer rotor 30, a second loop is this: the magnetic flux travels from inner rotor 20, inner teeth 13 of stator 10, stator yoke 14, and returns to inner rotor 20. These loops leave apparent air-gaps similar to that of a single-rotor motor, so that this motor can obtain an added-up output of two single-rotor motors.

Since the motor of the present invention employs the toroidal winding, the coil end and the winding length can be downsized from those of the conventional distributed winding, so that a resistance of the winding can be lowered, thereby reducing the copper loss, and as a result, a highly efficient motor is obtainable.

The foregoing discussion proves that the use of the combination of the number of slots "S" and the number of poles "P" allows achieving a motor that embodies lower vibration, lower noise, higher efficiency, and a downsized body. The combination of S:P=3:5, in particular, is optimum and produces advantages of the present invention to the maximum extent. FIG. 6 tells why this combination is the best, namely, in the case of 12 slots, the combination of S:P=12:20 produces the maximum torque constant.

In this embodiment, both of inner and outer rotors 20, 30 are described as the surface-permanent-magnet motor (SPM motor), i.e. permanent magnets are mounted on the surface of the rotor yoke, however, the present invention is not limited to this instance. An interior-permanent-magnet motor (IPM motor), i.e. the permanent magnets are embedded in holes provided to the rotor yoke, can be used instead of the SPM type motor. Either one of inner rotor 20 or outer rotor 30 can be the IPM type motor.

Use of rare earth permanent magnet or embedding the magnets in the holes within the rotor allows making use of reluctance torque and the magnetic flux of the magnets, so that further effect can be expected.

In this embodiment, the outer rotor frame and the inner rotor frame are employed, and they are coupled to rotary shaft 40; however, they can be eliminated and outer rotor 30 can be coupled to inner rotor 20 with resin mold instead.

The motor of the present invention includes the features of the conventional motor with distributed winding, i.e. low noise and low vibration, and also the features of the motor with concentrated winding, i.e. high efficient and a small body, and yet, the use of the combination of the number of slots "S" and the number of magnet poles "P", which is the feature of the double-rotor motor with toroidal winding, allows canceling out the radial force of the inner rotor and the outer rotor, so that the motor of the present invention can achieve the lower vibration and the lower noise.

INDUSTRIAL APPLICABILITY

The motor of the present invention is useful to home appliances and automotive electronics which need to be downsized and are required to output high power, work efficiently, produce low vibration and low noise, and are manufactured at a low cost.

The invention claimed is:

1. A motor comprising:
a stator including:
a stator core having:
an annular stator yoke;
a plurality of inner teeth projecting from the stator yoke toward inside along a radial direction;
a plurality of outer teeth, in equal quantity to the inner teeth, projecting from the stator yoke toward outside along the radial direction;
inner slots formed between each one of the inner teeth; and
outer slots formed between each one of the outer teeth;
a plurality of coils wound on the stator yoke between the inner slots and the outer slots, and coupled together in one of a three-phase star-shaped wire connection manner and a three-phase delta-shaped wire connection manner,
an inner rotor confronting the inner teeth with an air-gap in between, and including an inner rotor yoke and an inner permanent magnet; and
an outer rotor confronting the outer teeth with an air-gap in between, and including an outer rotor yoke and an outer permanent magnet,
wherein the inner rotor is coupled to a rotary shaft to which the outer rotor is coupled,
wherein the inner slots and the outer slots are in equal number "S", and the inner permanent magnet and the outer permanent magnet have poles in equal number "P",
wherein the number of slots "S" and the number of poles "P" establish a relation of S:P=3:2N−1, where N is an integer equal to 3 or more, and where a case when 2N−1 becomes a multiple of 3 is excluded.

2. The motor of claim 1, wherein the number of slots "S" and the number of poles "P" establish a relation of S:P=3:5.

3. The motor of claim 1, wherein at least one of the inner permanent magnet and the outer permanent magnet is disposed on a surface of the inner rotor yoke and a surface of the outer rotor yoke.

4. The motor of claim 1, wherein at least one of the inner permanent magnet and the outer permanent magnet is embedded in the inner rotor yoke and inside the outer rotor yoke.

5. The motor of claim 1, wherein the rotary shaft rotates at a speed including as low as 10 rpm-100 rpm.

6. The motor of claim 1, wherein driving torque produced by the inner rotor and that produced by the outer rotor are added up, and cogging torque produced by the inner rotor and that produced by the outer rotor are cancelled out.

* * * * *